United States Patent
Kim et al.

(10) Patent No.: US 9,331,826 B2
(45) Date of Patent: May 3, 2016

(54) METHOD AND APPARATUS FOR TRANSMITTING CONTROL INFORMATION IN A WIRELESS COMMUNICATION SYSTEM

(75) Inventors: Hyungtae Kim, Gyeonggi-do (KR); Hanbyul Seo, Gyeonggi-do (KR); Hakseong Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 14/004,962

(22) PCT Filed: Apr. 13, 2012

(86) PCT No.: PCT/KR2012/002791
§ 371 (c)(1),
(2), (4) Date: Sep. 13, 2013

(87) PCT Pub. No.: WO2012/141513
PCT Pub. Date: Oct. 18, 2012

(65) Prior Publication Data
US 2014/0036881 A1 Feb. 6, 2014

Related U.S. Application Data

(60) Provisional application No. 61/474,748, filed on Apr. 13, 2011.

(51) Int. Cl.
*H04L 5/00* (2006.01)
(52) U.S. Cl.
CPC ............... *H04L 5/003* (2013.01); *H04L 5/001* (2013.01); *H04L 5/0023* (2013.01); *H04L 5/0048* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2005/0107036 A1* | 5/2005 | Song et al. | 455/23 |
| 2005/0143123 A1* | 6/2005 | Black et al. | 455/552.1 |
| 2006/0276192 A1* | 12/2006 | Dutta et al. | 455/436 |
| 2008/0085710 A1* | 4/2008 | Prateek | 455/436 |
| 2008/0287138 A1 | 11/2008 | Yoon et al. | |
| 2009/0074090 A1 | 3/2009 | Xu et al. | |

(Continued)

FOREIGN PATENT DOCUMENTS

| CN | 1879325 A | 12/2006 |
|---|---|---|
| KR | 10-2005-0078636 A | 8/2005 |

(Continued)

OTHER PUBLICATIONS

Written Opinion and International Search Report issued in corresponding International Patent Application No. PCT/KR2012/002791 dated Nov. 28, 2012.

(Continued)

*Primary Examiner* — Anez Ebrahim
(74) *Attorney, Agent, or Firm* — Morgan, Lewis & Bockius LLP

(57) ABSTRACT

The embodiments of the present invention relate to a method for transmitting control information by a base station in a wireless communication system, wherein the method comprises a step of transmitting a physical downlink control channel (PDCCH). The downlink control information of the PDCCH may include an indicator indicating whether or not a reference signal is transmitted in a time domain corresponding to the subframe in which the PDCCH is transmitted.

15 Claims, 15 Drawing Sheets

(56) References Cited

U.S. PATENT DOCUMENTS

2012/0113889 A1    5/2012    Noh et al.
2013/0003587 A1*    1/2013    Tzannes et al. ............... 370/252

FOREIGN PATENT DOCUMENTS

| KR | 10-2010-0078232 A | 7/2010 |
|---|---|---|
| KR | 10-2011-0007986 A | 1/2011 |
| WO | 2010/077042 A2 | 7/2010 |

OTHER PUBLICATIONS

Office Action dated Aug. 26, 2015, issued by the Chinese Patent Office in Chinese Patent Application No. 201280017984.3.

* cited by examiner

FIG. 5
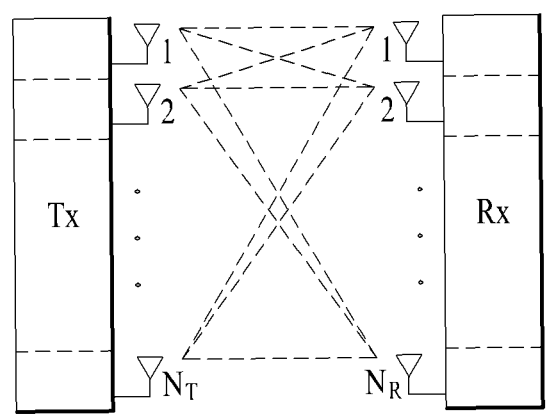
(a)
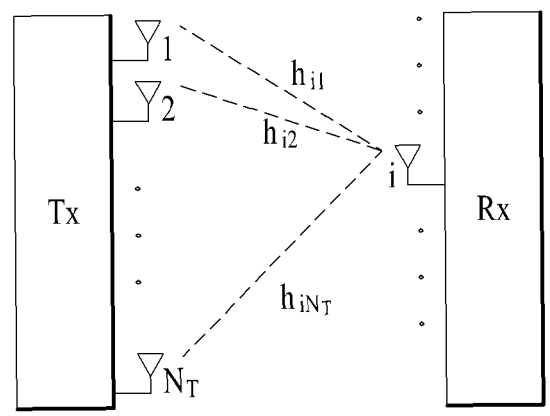
(b)

METHOD AND APPARATUS FOR TRANSMITTING CONTROL INFORMATION IN A WIRELESS COMMUNICATION SYSTEM

FIELD OF THE INVENTION

The present invention relates to a method and apparatus for transmitting control information in a wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DETAILED DESCRIPTION OF THE INVENTION

Technical Problem

Accordingly, the present invention is directed to a method and apparatus for transmitting control information in a wireless communication system that substantially obviates one or more problems due to limitations and disadvantages of the related art. An object of the present invention is to provide a method and apparatus for transmitting control information in a wireless communication system, and more particularly to a method for aperiodically transmitting a reference signal (RS) to an unlicensed band, and a method for indicating whether the reference signal (RS) is transmitted in the unlicensed band.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting control information of a base station (BS) in a wireless communication system, the method including: transmitting a physical downlink control channel (PDCCH), wherein downlink control information (DCI) of the PDCCH includes an indicator indicating whether a reference signal (RS) is transmitted in a time interval corresponding to a subframe to which the PDCCH is transmitted.

In accordance with a second aspect of the present invention, a method for receiving control information of a user equipment (UE) in a wireless communication system includes: receiving a physical downlink control channel (PDCCH), wherein downlink control information (DCI) of the PDCCH includes an indicator indicating whether a reference signal (RS) is transmitted in a time interval corresponding to a subframe to which the PDCCH is transmitted.

In accordance with a third aspect of the present invention, a base station (BS) apparatus for use in a wireless communication system includes: a transmission (Tx) module; and a processor, wherein the processor transmits a physical downlink control channel (PDCCH), and downlink control information (DCI) of the PDCCH includes an indicator indicating whether a reference signal (RS) is transmitted in a time interval corresponding to a subframe to which the PDCCH is transmitted.

In accordance with a fourth aspect of the present invention, a user equipment (UE) apparatus for use in a wireless communication system includes: a reception (Rx) module; and a processor, wherein the processor receives a physical downlink control channel (PDCCH), wherein downlink control information (DCI) of the PDCCH includes an indicator indicating whether a reference signal (RS) is transmitted in a time interval corresponding to a subframe to which the PDCCH is transmitted.

The first to fourth technical aspects of the present invention may include some or all of the following description.

The subframe to which the PDCCH is transmitted may be a resource of a licensed band, where the time interval may be a resource of an unlicensed band, and the reference signal (RS) may be periodically transmitted in the licensed band.

The downlink control information (DCI) may include uplink grant information, where the uplink grant information is contained in channel state information (CSI) request information of the downlink control information (DCI).

If the CSI request information may be configured in a manner that channel state information is requested from a user equipment (UE), the indicator may indicate that the reference signal (RS) is transmitted in the time interval.

The PDCCH may be masked with a common identifier (ID) of a plurality of UEs located in a cell.

The reference signal (RS) may be any one of a cell-specific reference signal, a channel state information-reference signal (CSI-RS) or a CSI-RS having transmission (Tx) power of zero.

The resource for transmission of the reference signal (RS) may be always decoded by a user equipment (UE) during the time interval, and the decoded information may be discarded when the indicator indicates non-transmission of the reference signal (RS).

Effects of the Invention

As is apparent from the above description, according to exemplary embodiments of the present invention, if a reference signal (RS) is aperiodically transmitted in the unlicensed band, a UE having received a signal of the unlicensed band can recognize whether or not the RS is transmitted, such that channel measurement can be efficiently carried out.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 5 is a diagram illustrating a wireless communication system including multiple antennas.

BEST MODE FOR CARRYING OUT THE INVENTION

Figure 1:
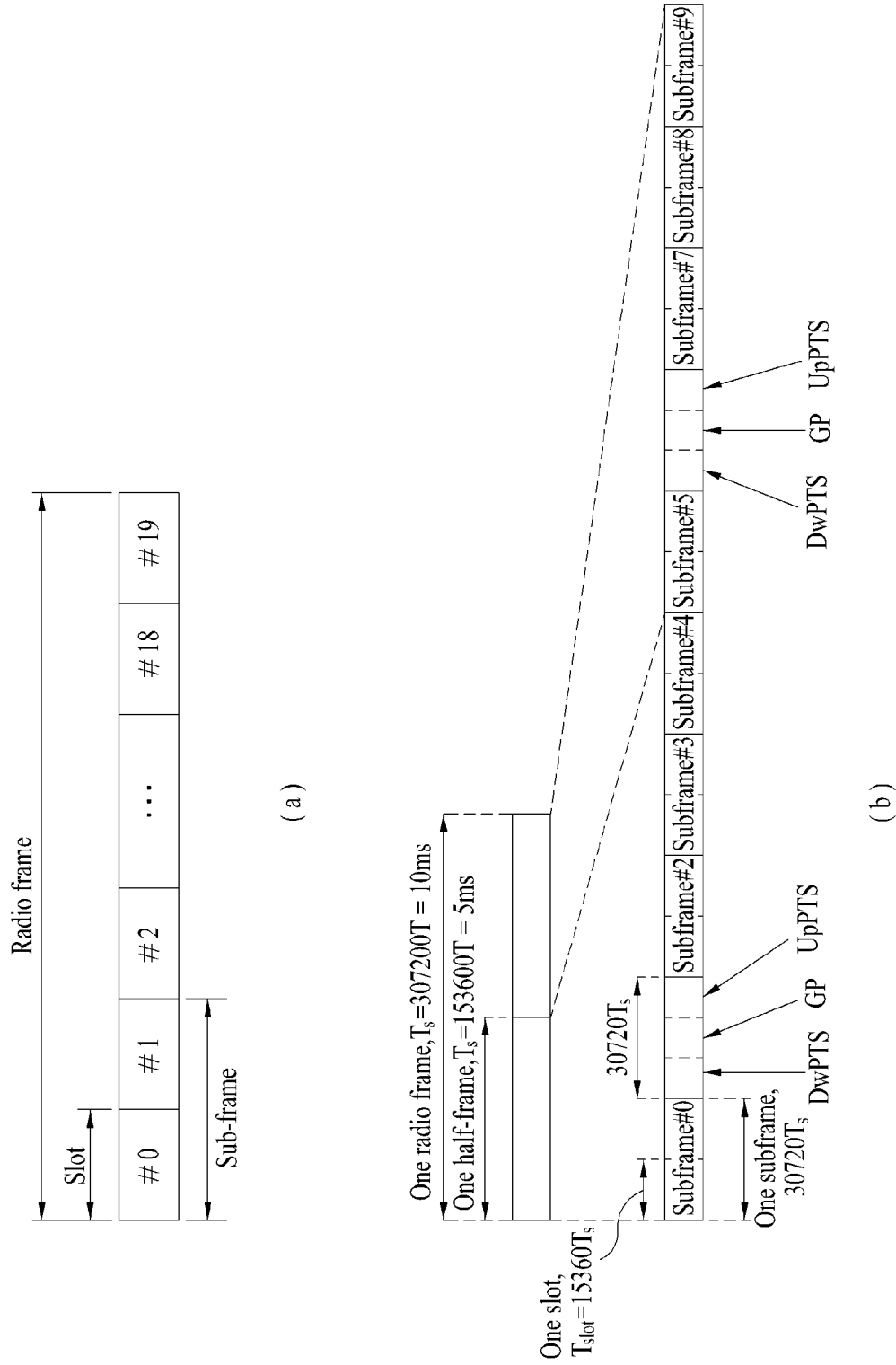
FIG. 1 exemplarily shows a radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure for use in the LTE system. Referring to FIG. 1(a), a radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in time domain. Since the LTE system uses OFDMA in downlink, the OFDM symbol indicates one symbol duration. One OFDM symbol may be called an SC-FDMA symbol or a symbol duration. An RB is a resource allocation unit and includes a plurality of contiguous subcarriers in one slot. The structure of the radio frame is only exemplary. Accordingly, the number of subframes included in one radio frame, the number of slots included in one subframe, or the number of OFDM symbols included in one slot may be changed in various manners.

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

The structure of the radio frame is only exemplary. Accordingly, the number of subframes included in the radio frame, the number of slots included in the subframe or the number of symbols included in the slot may be changed in various manners.

Figure 2:
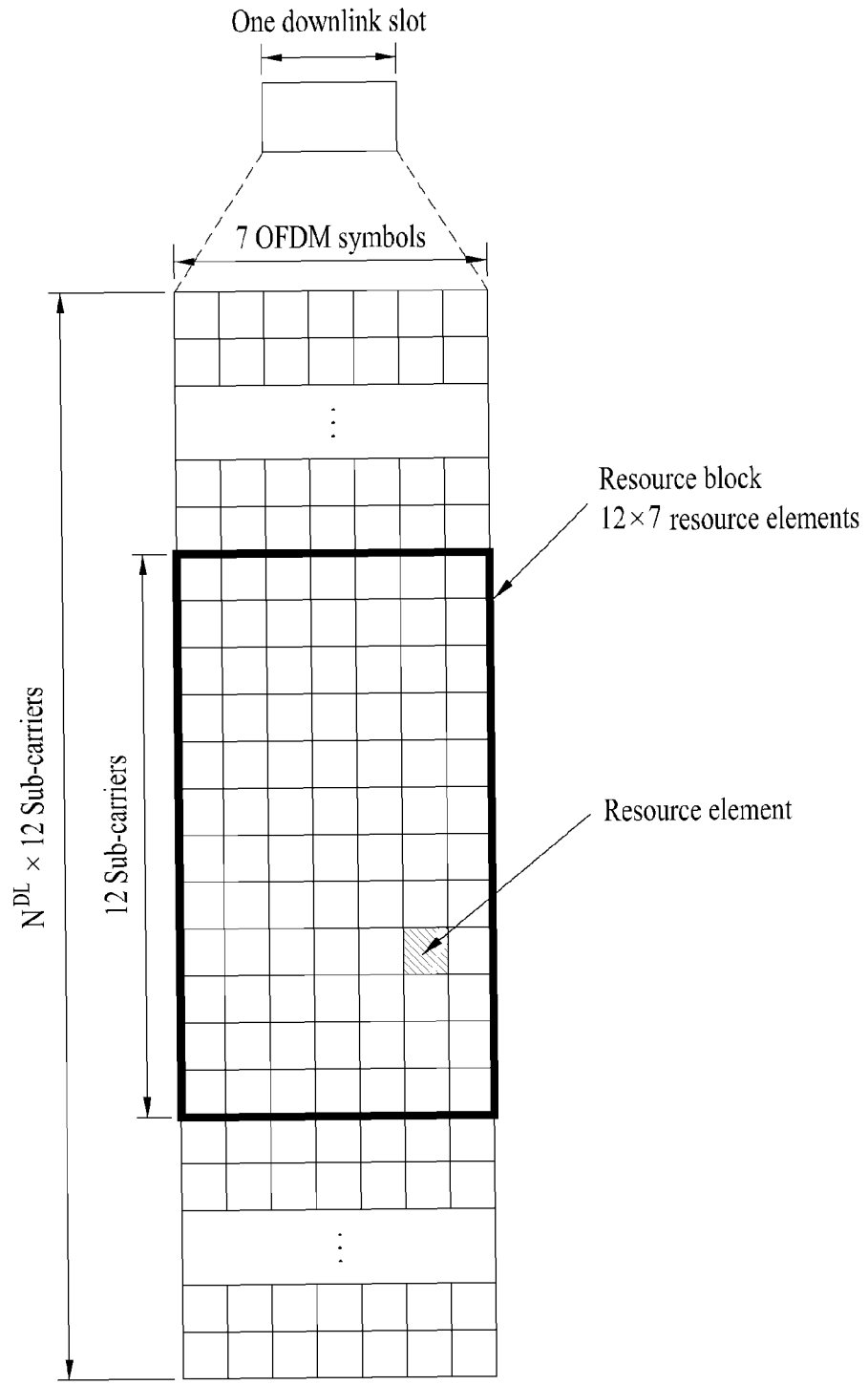
FIG. 2 exemplarily shows a resource grid of a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
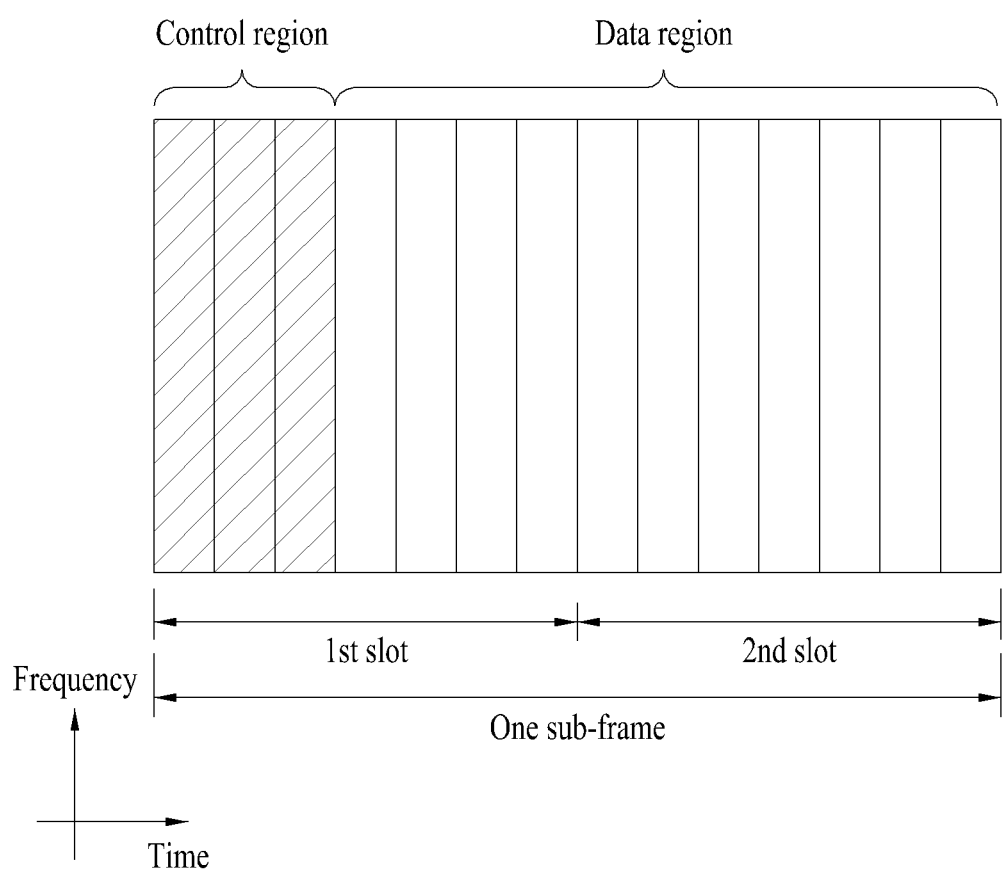
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc.

PCFICH is transmitted at a first OFDM symbol of a subframe, and includes information about the number of OFDM symbols used to transmit the control channel in the subframe.

PHICH includes a HARQ ACK/NACK signal as a response to uplink transmission. PDCCH transmits downlink control information (DCI). DCI may include uplink or downlink scheduling information or an uplink transmit power control command for an arbitrary UE group according to format. DCI formats 0, 1, 1A, 1B, 1C, 1D, 2, 2A, 2B, 2C, 3, 3A and 4 are defined in LTE-A (release 10). DCI formats 0, 1A, 3 and 3A have the same message size to reduce the number of blind decoding operations, which will be described later. The DCI formats may be divided into i) DCI formats 0 and 4 used for uplink scheduling grant, ii) DCI formats 1, 1A, 1B, 1C, 2, 2A, 2B and 2C used for downlink scheduling allocation, and iii) DCI formats 3 and 3A for power control commands according to purpose of control information to be transmitted.

DCI format 0 used for uplink scheduling grant may include a carrier indicator necessary for carrier aggregation which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, information for a UE to transmit a PUSCH, a modulation and coding scheme, a new data indicator used to empty a buffer for initial transmission with respect to an HARQ process, a transmit power control (TPC) command for a scheduled PUSCH, information on a cyclic shift for a demodulation reference signal (DMRS) and OCC index, and an uplink index and channel quality indicator request necessary for a TDD operation, etc. DCI format 0 does not include a redundancy version, differently from DCI formats relating to downlink scheduling allocation, because DCI format 0 uses synchronous HARQ. The carrier offset is not included in DCI formats when cross-carrier scheduling is not used.

DCI format 4 is newly added to DCI formats in LTE-A release 10 and supports application of spatial multiplexing to uplink transmission in LTE-A. DCI format 4 has a larger message size because it further includes information for spatial multiplexing. DCI format 4 includes additional control information in addition to control information included in DCI format 0. DCI format 4 includes information on a modulation and coding scheme for the second transmission block, precoding information for multi-antenna transmission, and sounding reference signal (SRS) request information. DCI format 4 does not include the offset for format 0/format 1A differentiation because it has a size larger than DCI format 0.

DCI formats 1, 1A, 1B, 1C, 1D, 2, 2A, 2B and 2C for downlink scheduling allocation may be divided into DCI formats 1, 1A, 1B, 1C and 1D that do not support spatial multiplexing and DCI formats 2, 2A, 2B and 2C that support spatial multiplexing.

DCI format 1C supports only frequency contiguous allocation as compact frequency allocation and does not include the carrier indicator and redundancy version, compared to other formats.

DCI format 1A is for downlink scheduling and random access procedure. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission with respect to a HARQ process, a TPC command for a PUCCH, an uplink index necessary for a TDD operation, etc.

DCI format 1 includes control information similar to that of DCI format 1A. DCI format 1 supports non-contiguous resource allocation whereas DCI format 1A supports contiguous resource allocation. Accordingly, DCI format 1 further includes a resource allocation header, and thus slightly increases control signaling overhead as a trade-off for an increase in resource allocation flexibility.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C may be regarded as an extended version of DCI format 2B and supports spatial multiplexing for up to 8 layers.

DCI formats 3 and 3A may be used to complement the TPC information included in the aforementioned DCI formats for uplink scheduling grant and downlink scheduling allocation, that is, to support semi-persistent scheduling. A 1-bit command is used per UE in the case of DCI format 3 whereas a 2-bit command is used per UE in the case of DCI format 3A.

One of the above-mentioned DCI formats is transmitted through a PDCCH, and a plurality of PDCCHs may be transmitted in a control region. A UE can monitor the plurality of PDCCHs.

PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
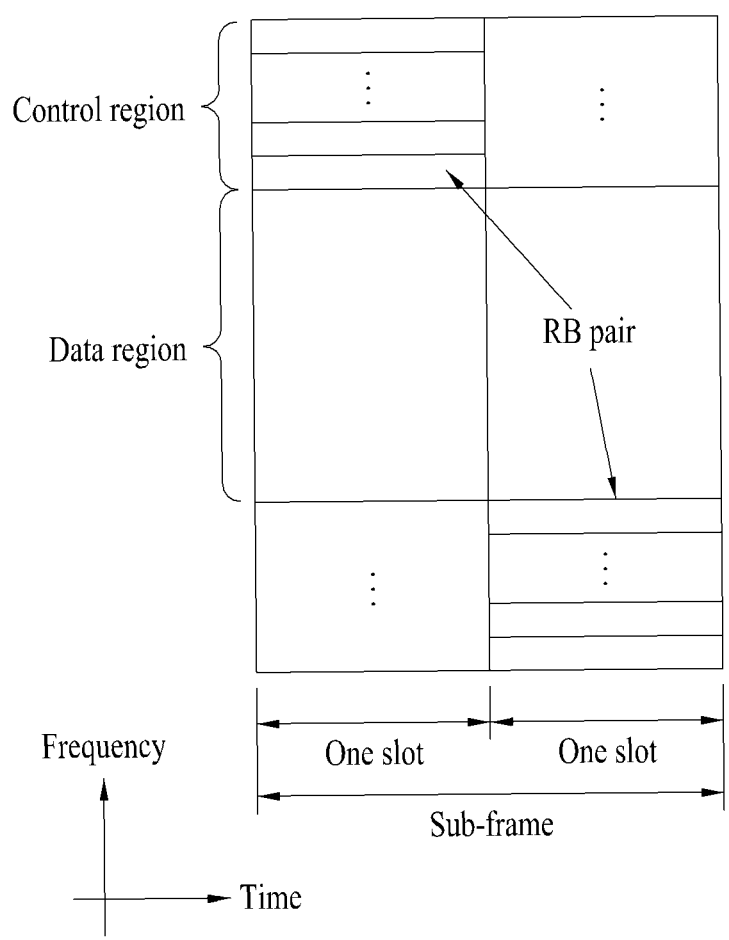
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

FIG. 5 is a diagram showing the configuration of a wireless communication system having multiple antennas.

As shown in FIG. 5(a), if the number of transmit antennas is increased to $N_T$ and the number of receive antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \quad \text{[Equation 1]}$$

For example, in an MIMO system using four transmit antennas and four receive antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmit antennas and $N_R$ receive antennas are present.

In transmitted signals, if the $N_T$ transmit antennas are present, the number of pieces of maximally transmittable information is $N_T$. The transmitted information may be expressed as follows.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the $N_T$ actually transmitted signals $x_1, x_2, \ldots, x_{N_T}$ are configured by applying a weight matrix W to the information vector $\hat{s}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an i-th transmit antenna and j-th information. W is also called a precoding matrix.

If the $N_R$ receive antennas are present, respective received signals $y_1, y_2, \ldots, y_{N_R}$ of the antennas are expressed as follows.

$$y = [y_1, y_2, \ldots, y_{N_R}]^T \quad \text{[Equation 6]}$$

If channels are modeled in the MIMO radio communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram showing channels from the $N_T$ transmit antennas to the receive antenna i. The channels may be combined and expressed in the form of a vector and a matrix. In FIG. 5(b), the channels from the $N_T$ transmit antennas to the receive antenna i may be expressed as follows.

$$h_i^T = [h_{i1}, h_{i2}, \ldots, h_{iN_T}] \quad \text{[Equation 7]}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

An Additive White Gaussian Noise (AWGN) is added to the actual channels after a channel matrix H. The AWGN $n_1$, $n_2$, ..., $n_{N_R}$ added to the $N_T$ transmit antennas may be expressed as follows.

$$n = [n_1, n_2, \ldots, n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H indicating the channel state is determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the number of rows or columns, which are independent of each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

When the matrix is subjected to Eigen value decomposition, the rank may be defined as the number of Eigen values excluding 0. Similarly, the rank may also be defined as the number of singular values excluding 0 when the matrix is subjected to singular value decomposition. Accordingly, the physical meaning of the rank in the channel matrix may be considered the maximum number of different pieces of information that can be transmitted in a given channel.

In the description of this disclosure, the 'rank' of MIMO transmission indicates the number of paths through which a signal can be independently transmitted at a specific time and a specific frequency resource and the 'number of layers' indicates the number of signal streams transmitted through the paths. Generally, since the transmission end transmits a number of layers corresponding to the rank number used for signal transmission, rank has the same meaning as number of layers unless specifically stated otherwise.

Coordinated Multi-Point (CoMP)

According to the improved system performance requirements of the LTE-A system, CoMP transmission/reception technology (what may be referred to as co-MIMO, collaborative MIMO or network MIMO) is proposed. The CoMP technology can increase the performance of a UE located at a cell edge and increase average sector throughput.

In general, in a multi-cell environment in which a frequency reuse factor is 1, the performance of the UE located at the cell edge and average sector throughput may be reduced due to Inter-Cell Interference (ICI). In order to reduce the ICI, in the existing LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, the ICI is preferably reduced or the UE reuses the ICI as a desired signal. In order to accomplish the above object, a CoMP transmission scheme may be applied.

The CoMP scheme applicable to downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by coordination of the cells of the CoMP unit.

Carrier Aggregation

Figure 6:
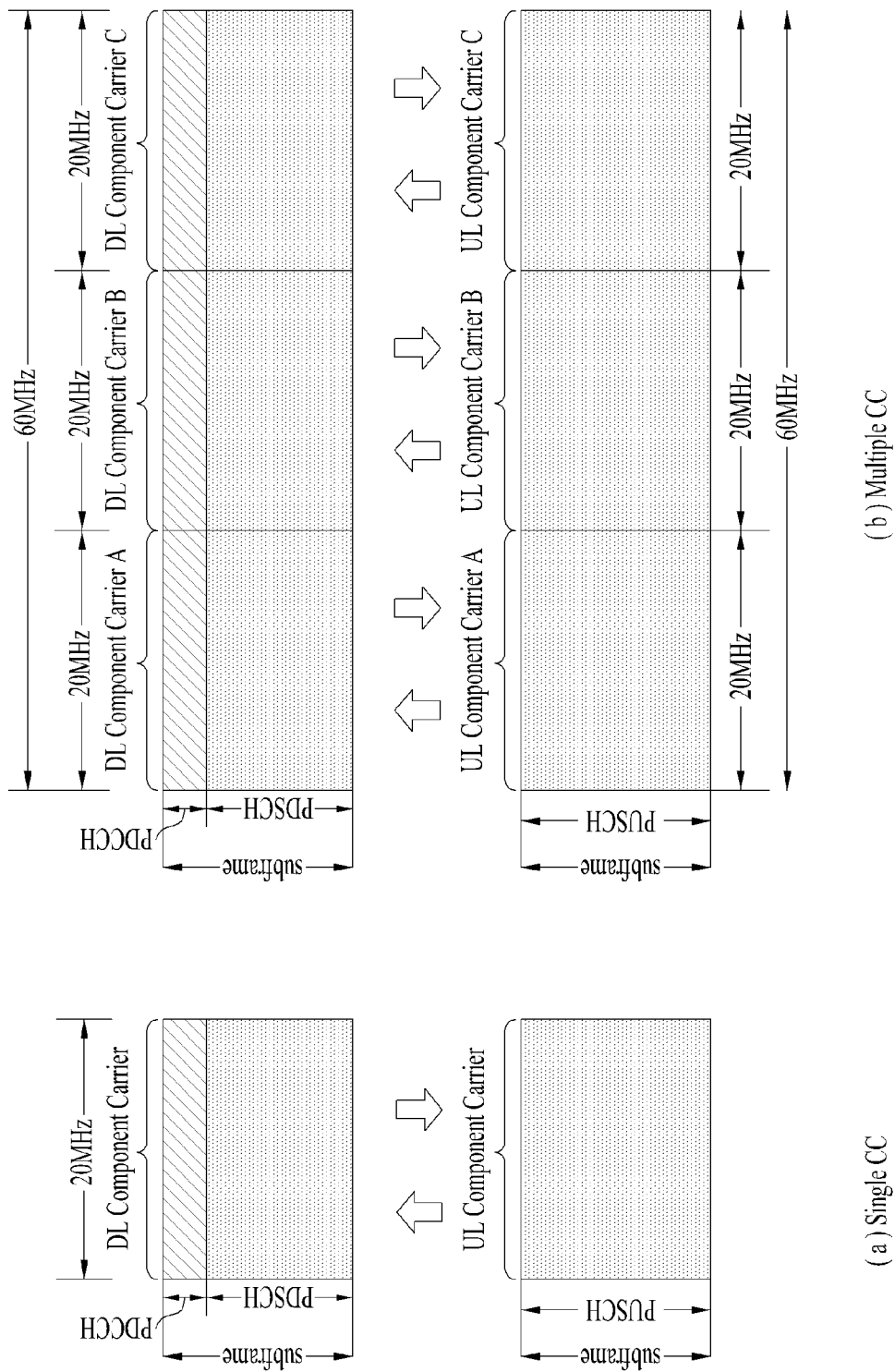
FIG. 6 is a conceptual diagram illustrating carrier aggregation (CA).

FIG. 6 is a conceptual diagram illustrating carrier aggregation. Prior to describing carrier aggregation, a cell used for managing radio resources by LTE-A will hereinafter be described in detail. The cell may be understood to be a combination of DL resources and UL resources. In this case, UL resources are not mandatory, and therefore the cell may be composed of DL resources only, or may also be composed of DL resources and UL resources. The above-mentioned description is defined in the current LTE-A Release 10. If necessary, the cell may also be composed of UL resources only. DL resources may be referred to as a downlink component carrier (DL CC), and UL resources may be referred to as an uplink component carrier (UL CC). DL CC or UL CC may be represented by a carrier frequency, and the carrier frequency indicates a center frequency for use in the corresponding cell.

Cells may be classified into a primary cell (PCell) operating at a primary frequency and a secondary cell (SCell) operating at a secondary frequency. PCell and SCell may be generically named a serving cell. PCell may be set to either a cell indicated when a UE performs initial connection establishment or a cell indicated in a connection reconfiguration process or handover process. That is, PCell may be understood to be a cell serving as the control-related center in a carrier aggregation environment to be described later. The UE receives PUCCH from its own PCell, and transmits the received PUCCH. SCell may be constructed after RRC (Radio Resource Control) connection establishment, and may be used to provide additional radio resources. The remaining serving cells other than the PCell may be considered to be SCells in the carrier aggregation environment. Provided that carrier aggregation is not configured in the UE of an RRC_CONNECTED status or the UE does not support carrier aggregation, there is only one serving cell composed of only a PCell. In contrast, if carrier aggregation is configured in the UE of an RRC_CONNECTED status, there is at least one serving cell, and a PCell and all SCells are included in the serving cell. For a UE supporting carrier aggregation, after starting an initial security activation process, one or more SCells can be configured in addition to a PCell initially configured in the connection establishment process.

Carrier aggregation will hereinafter be described with reference to FIG. 6. Carrier aggregation has been introduced to utilize a wider band for satisfying high-speed transfer rate. Carrier aggregation is defined as an aggregate of two or more component carriers (CCs) having different carrier frequencies. FIG. 6(a) shows a subframe in the case that one CC is utilized in the legacy LTE system, and FIG. 6(b) shows a subframe in the case that carrier aggregation is utilized. FIG. 6(b) exemplarily shows that three 20 MHz CCs are used to support a total bandwidth of 60 MHz. In this case, individual CCs are contiguous or non-contiguous to each other.

The UE can simultaneously receive and monitor DL data through several DL CCs. A linkage between each DL CC and each UL CC may be indicated by system information. DL CC/UL CC link may be fixed in the system or semi-statically configured in the system. In addition, although the entire system bandwidth is composed of N CCs, a frequency band capable of being monitored/received by a specific UE may be limited to M CCs. (where M<N). Various parameters for carrier aggregation may be cell-specifically, UE group-specifically, or UE-specifically configured.

Figure 7:
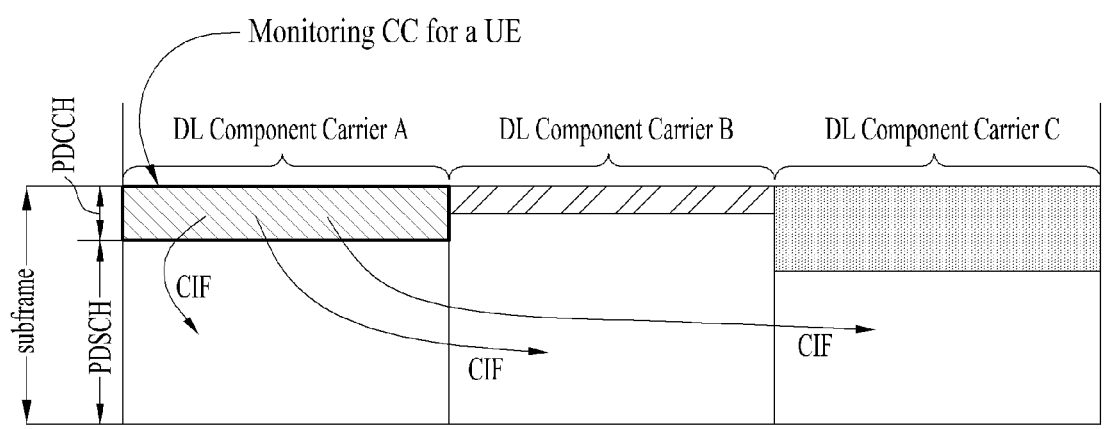
FIG. 7 is a conceptual diagram illustrating cross-carrier scheduling.

FIG. 7 is a conceptual diagram illustrating cross-carrier scheduling. For example, cross-carrier scheduling indicates that downlink scheduling allocation information of different DL CCs is contained in a control region of any one of the serving cells, or indicates that uplink scheduling acknowledgement (ACK) information of several UL CCs linked to the corresponding DL CC is contained in a control region of any one DL CC selected from among several serving cells.

First, a carrier indicator field (CIF) will hereinafter be described in detail.

CIF may be contained or not contained in a DCI format transmitted over a PDCCH. If CIF is contained in the DCI format, the resultant CIF indicates that cross-carrier scheduling is applied. If cross-carrier scheduling is not applied, downlink scheduling allocation information is considered to be valid in a DL CC via which current DL scheduling assignment information is transmitted. In addition, uplink scheduling acknowledgement is considered to be valid in one UL CC linked to a DL CC via which downlink scheduling allocation information is transmitted.

If cross-carrier scheduling is applied, CIF indicates a CC related to downlink scheduling allocation information transmitted over a PDCCH in any one of DL CCs. For example, as can be seen from FIG. 7, downlink allocation information (i.e., information regarding PDSCH resources) for DL CC B and DL CC C is transmitted through a PDCCH contained in a control region of DL CC A. The UE monitors DL CC A, such that it can recognize a resource region of a PDSCH and the corresponding CC through a CIF.

Information as to whether CIF is contained in a PDCCH or not may be semi-statically configured, or may be UE-specifically activated by higher layer signaling. If CIF is disabled, PDSCH resources of the same DL CC may be assigned to a PDCCH of a specific DL CC, and PUSCH resources of a UL CC linked to a specific DL CC may be assigned. In this case, the same coding scheme, the same CCE based resource mapping, and the same DCI format as those of the legacy PDCCH structure may be used as necessary.

Meanwhile, if CIF is enabled, PDSCH/PUSCH resources on one DL/UL CC indicated by a CIF from among multiple aggregated CCs may be assigned to a PDCCH of a specific DL CC. In this case, CIF may be additionally defined in the legacy PDCCH DCI format or be defined as a fixed field that is 3 bits long, and the CIF location may be fixed regardless of the DCI format size. In this case, the same coding scheme, the same CCE based resource mapping, and the same DCI format as those of the legacy PDCCH structure may also be applied.

Even in the case in which the CIF is present, a base station (BS) can allocate a DL CC set to be monitored, resulting in reduction in a load caused by blind decoding of a UE. A PUCCH monitoring CC set is a part of the entirely aggregated DL CC, and the UE can perform detection/decoding of a PDCCH in the corresponding CC set only. That is, in order to perform scheduling of PDSCH/PUSCH for a UE, the BS can transmit a PDCCH only through the PDCCH monitoring CC set. The PDCCH monitoring DL CC set may be UE-specifically, UE group-specifically, or cell-specifically configured. For example, if three DL CCs are aggregated as shown in FIG. 7, DL CC A may be set to a PDCCH monitoring DL CC. If CIF is disabled, a PDCCH on each DL CC may schedule only a PDSCH of DL CC A. Meanwhile, if the CIF is enabled, not only a PDCCH on DL CC A but also a PDSCH on other DL CCs can be scheduled. If DL CC A is set to a PDCCH monitoring CC, PDSCH is not transmitted in DL CC B and DL CC C.

In the system to which the above-mentioned carrier aggregation is applied, a UE may receive several PDSCHs through several DL carriers. In this case, the UE may be forced to transmit ACK/NACK of each piece of data through a single UL CC in a single subframe. In the case of transmitting multiple ACK/NACKs using PUCCH format 1a/1b in a single subframe, high Tx power is needed, PAPR for UL transmission is increased, and the Tx power amplifier is ineffectively used, such that a transmittable distance from the BS to the UE may be reduced. In order to transmit several ACK/NACKs over a single PUCCH, ACK/NACK bundling or ACK/NACK multiplexing may be applied.

In addition, it may be necessary to transmit ACK/NACK information, that is used for a large amount of DL data according to the application of carrier aggregation and/or a large amount of DL data transmitted in several DL subframes of a TDD system, over a PUCCH in one subframe. In this case, if the number of ACK/NACK bits to be transmitted is greater than the number of bits supportable by ACK/NACK bundling or multiplexing, it is impossible to correctly transmit ACK/NACK information using the above-mentioned methods.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for a BS (eNB) or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE (i.e., to geolocate a UE).

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in situations such as handover. The latter is an RS that a BS (eNB) transmits along with downlink data in specific resources. A UE can demodulate the data by measuring a channel using the RS. This RS should be transmitted in a data transmission area.

Figure 8:
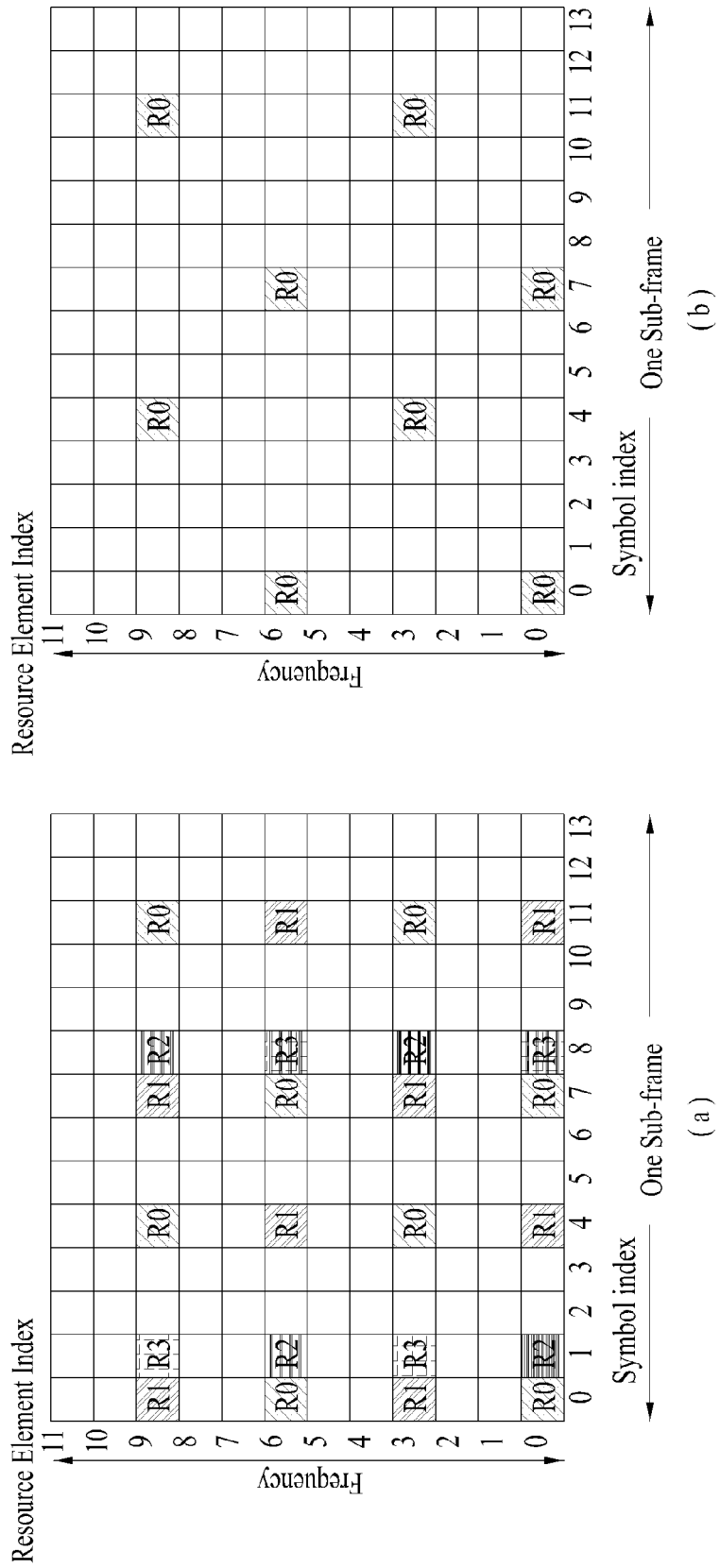
FIG. 8 is a conceptual diagram illustrating arrangement in a resource region of a reference signal (RS).

CRSs serve two purposes, namely, channel information acquisition and data demodulation. A UE-specific RS is used only for data demodulation. CRSs are transmitted in every subframe in a broad band and CRSs for up to four antenna ports are transmitted according to the number of Tx antennas in an eNB. For example, if the BS (eNB) has two Tx antennas, CRSs for antenna ports 0 and 1 are transmitted. In the case of four Tx antennas, CRSs for antenna ports 0 to 3 are respectively transmitted. FIG. 8(a) is a conceptual diagram illustrating a pattern within one RB of a CRS of the antenna port #0, and FIG. 8(b) is a conceptual diagram illustrating CRS pattern for a single RB when 4 Tx antennas are used by a base station (BS). Referring to FIGS. 8(a) and 8(b), if CRSs are mapped to time-frequency resources, an RS for one antenna port on a frequency axis is transmitted in a state of being mapped to one RE among 6 REs. Since one RB includes 12 REs on the frequency axis, two REs of one RB are used as REs for one antenna port.

The LTE-A system which is an evolution of the LTE system can support up to 8 transmit (Tx) antennas on downlink. Accordingly, the LTE-A system has to support RSs for up to 8 Tx antennas. Downlink RSs in the LTE system has been defined for only up to 4 antenna ports. Therefore, when an LTE-A system has 4 to 8 downlink transmit antennas, there is a need to additionally define RSs for the antenna ports in the LTE-A system. Both an RS for channel measurement and an RS for data demodulation need to be taken into consideration as RSs for up to 8 transmit (Tx) antenna ports.

One important consideration in designing an LTE-A system is backward compatibility. Backward compatibility is the ability to support existing LTE UEs such that the LTE UEs properly operate in the LTE-A system. If RSs for up to 8 transmit antennas are added to time-frequency domains in which a CRS defined in the LTE standard is transmitted every subframe over an entire band, RS overhead is excessively increased from the viewpoint of RS transmission. That is, assuming that the RS patterns for up to 8 Tx antennas are added to each subframe of the entire band in the same manner as in CRS of the legacy LTE, RS overhead excessively increases. Therefore, there is a need to take into consideration RS overhead reduction when designing new RSs for up to 8 antenna ports. RSs newly introduced in the LTE-A system may be largely classified into two types. One is a DeModulation RS (DM RS) which is an RS for demodulating data transmitted through up to 8 transmit antennas. The other is a Channel State Information RS (CSI-RS) which is an RS for channel measurement for selection of a Modulation and Coding Scheme (MCS), a Precoding Matrix Index (PMI), or the like.

The CSI-RS for channel measurement is characterized in that the CSI-RS is designed mainly for channel measurement unlike the CRS of the conventional LTE system which is used not only for measurement of handover or the like but also for data modulation. Of course, the CSI-RS may also be used for measurement of handover or the like. Since the CSI-RS is transmitted only for the purpose of obtaining information regarding a channel condition, the CSI-RS need not be transmitted every subframe, unlike the CRS of the conventional LTE system. Accordingly, to reduce CSI-RS overhead, the CSI-RS may be designed to be transmitted intermittently (periodically) in the time axis. For data demodulation, DM-RS is transmitted to a UE scheduled in the corresponding time-frequency domain. That is, DM-RS of a specific UE is transmitted only to a scheduled region (i.e., a time-frequency region for data reception) of the corresponding UE. Tx power of CSI-RS may be set to zero (i.e., zero-power CSI-RS). The zero-power CSI-RS may be adapted to measure interference caused by signal transmission from other BSs instead of a coordinated BS in CoMP or the like.

Meanwhile, the current LTE/LTE-A system uses time-frequency resources of the licensed band. In the past, since there is a small number of communication UEs, a sufficient amount of frequency resources may be used even though a specific enterprise exclusively uses the licensed band. However, as ubiquitous computing is more activated and the number of requests of a high data transfer rate increases, the demand of frequency resources rapidly increases, such that an insufficient amount of frequency resources becomes serious. As a result, the demand of frequency resources rapidly increases, and the shortage of frequency resources becomes actualized. Therefore, user interest of a technology for utilizing the unlicensed band is rapidly increasing in recent times. Therefore, the current LTE/LTE-A system operating on the basis of the licensed band may be extended in a manner that the LTE/LTE-A system can use the unlicensed band. Therefore, the LTE/LTE-A standards must be corrected and extended. The embodiments of the present invention provide a technology needed for additionally using the unlicensed band (for example, Television whitespace, etc.) in the current LTE/LTE-A standards based on the licensed band. Specifically, the embodiments provide a channel measurement scheme in which a BS and a UE may use not only the licensed band but also the unlicensed band, such that the BS and the UE may support the channel measurement scheme. In the current LTE/LTE-A system, reference signals (RSs) periodically transmit CRS, CSI-RS, etc. for the above channel measurement, and the UE calculates a CSI using the RSs and feeds back the CSI to the BS. It is difficult to apply the current RSs to the unlicensed band without change. That is, if there is a device configured to use the unlicensed band through carrier sensing, it is impossible to use the unlicensed band, such that an RS having periodic characteristics may not be transmitted to the corresponding transmission period. In this case, the UE assumes RS transmission and performs channel measurement. However, another device uses the unlicensed band and the RS is not transmitted, resulting in the occurrence of channel measurement failure.

Hereinafter, a method for enabling the UE to aperiodically transmit the above-mentioned CRS (for example, CSI-RS, zero-power CSI-RS, etc.) will hereinafter be described in detail. Specifically, the following description will disclose a method for indicating RS aperiodic transmission within the unlicensed band, and a method for informing a UE of specific information indicating whether or not the aperiodically-transmitted RS is transmitted. In the following description, control information indicating whether or not the aperiodically transmitted RS is transmitted is defined as Unlicensed Band Reference signal Indicator (UBRI).

Figure 9:
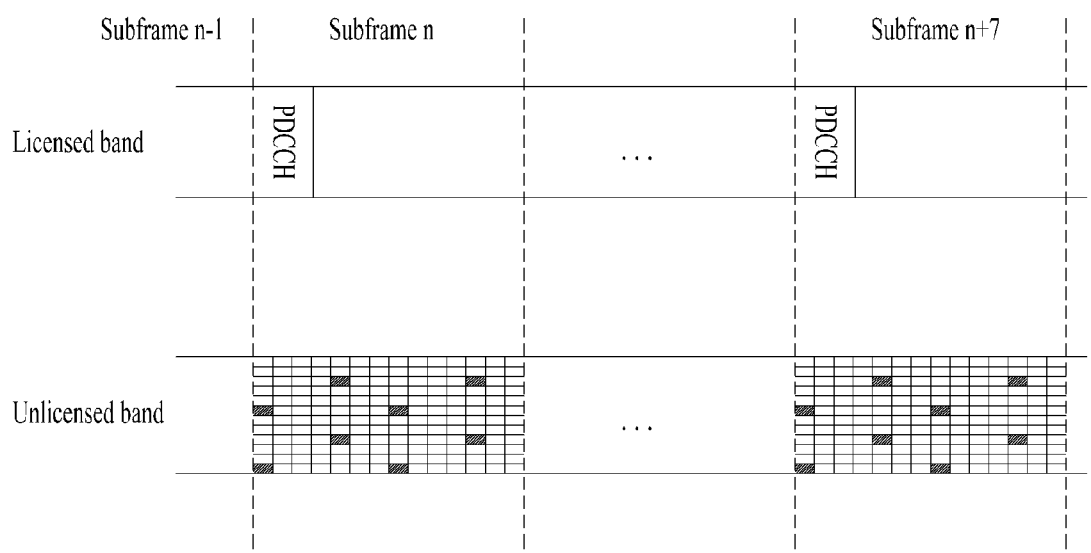
FIG. 9 is a conceptual diagram illustrating aperiodic RS transmission and UBRI (Unlicensed Band Reference signal Indicator) according to an embodiment of the present invention.

FIG. 9 is a conceptual diagram illustrating aperiodic RS transmission and UBRI (Unlicensed Band Reference signal Indicator) according to an embodiment of the present invention.

Referring to FIG. 9, it can be recognized that a reference signal RS (shade part, exemplarily showing a CRS pattern) is included in a signal transmitted in the time interval of unlicensed band corresponding to the subframes #n and #n+7 of the licensed band. In this case, it is assumed that the signal transmitted in the unlicensed band can be used by the BS through frequency sensing or the like. Frequency sensing may be performed before signals are transmitted in the unlicensed band. For example, the frequency sensing may be performed in a time domain corresponding to the end part of the subframe #n−1 of FIG. 9. However, the scope or spirit of the present invention is not limited thereto, and frequency sensing may be performed in a first time interval of the subframe #n, differently from FIG. 9. Alternatively, the time interval of the unlicensed band corresponding to the subframe #n may be a predetermined time in which carrier sensing is performed at a specific time located before the subframe #n. Here, the predetermined time may be guaranteed according to the frequency use regulation of the unlicensed band.

In order to inform the UE of specific information indicating that a reference signal (RS) is contained in a signal transmitted in the time interval of the unlicensed band corresponding to the subframe #n of the licensed band, the BS may use a PDCCH transmitted in the subframe #n of the licensed band. That is, the above-mentioned UBRI may be contained in DCI transmitted through a PDCCH. DCI including UBRI may be transmitted in a UE-specific search space or a common search space. If DCI is transmitted in the UE-specific search space, the UE decodes a PDCCH received at the subframe 3n of the licensed band, such that it may recognize whether a signal transmitted in a time interval of the unlicensed band corresponding to the subframe #n of the licensed band includes the RS. If DCI is transmitted in the common search space, several UEs located in the BS can recognize whether or not a signal transmitted in the time interval of the unlicensed band corresponding to the subframe #n includes the RS. In this case, although the time interval of the unlicensed band capable of recognizing whether the RS is transmitted through a PDCCH has been explained as a subframe to which the corresponding PDCCH is transmitted, assuming that a signal is transmitted in the unlicensed band during a time interval longer than a subframe of the licensed band, and it is possible to establish a variety of correlations related to the subframe including a specific time at which a signal starts transmission to the unlicensed band. In addition, PDCCH may indicate whether the RS is transmitted in a time interval of the unlicensed band corresponding to the subframe to which a PDCCH is transmitted, and may also indicate whether the RS is transmitted in the next time interval.

Figure 10:
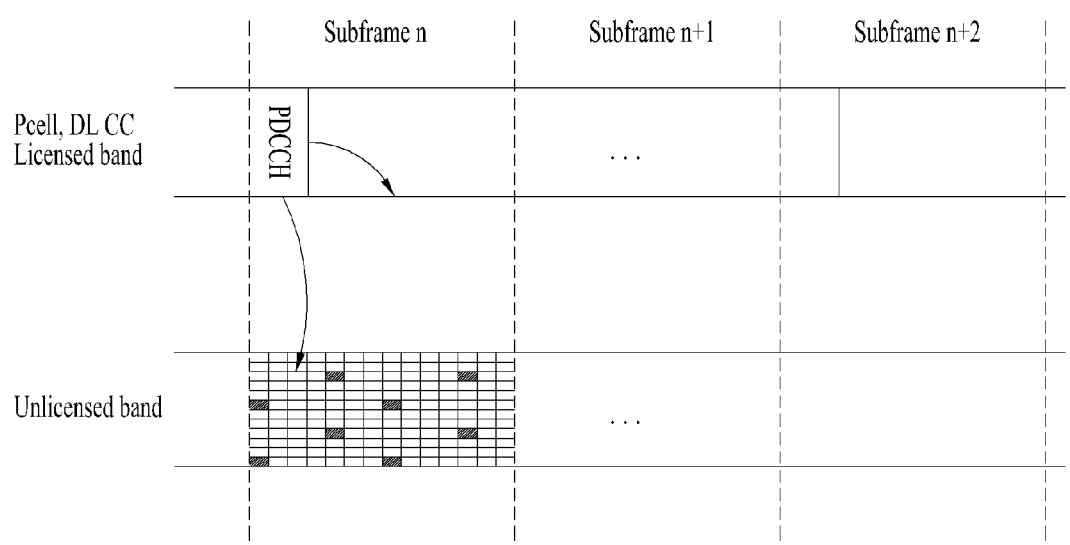
FIG. 10 is a conceptual diagram illustrating aperiodic RS transmission and UBRI (Unlicensed Band Reference signal Indicator) according to another embodiment of the present invention.

FIG. 10 is a conceptual diagram illustrating aperiodic RS transmission and UBRI (Unlicensed Band Reference signal Indicator) according to another embodiment of the present invention.

Referring to FIG. 10, it can be recognized that cross-carrier scheduling is applied to the unlicensed band. That is, a specific frequency band of the licensed band is used as PCell, and the unlicensed band is used as SCell, and the unlicensed band may be designated by a CIF. DCI of a PDCCH transmitted in a DLCC of PCell may include UBRI indicating whether the RS (shade part) is contained in a PDSCH transmitted in SCell of the unlicensed band.

If a PDSCH of a specific UE is transmitted in SCell, the specific UE may perform decoding according to a UBRI indication message. In more detail, if UBRI indicates that the RS is not transmitted, the UE performs decoding on the assumption of the absence of RS. If UBRI indicates RS transmission, the UE excludes an RE to which the RS is transmitted at PDSCH, and then performs decoding.

A method for transmitting the UBRI via a PDCCH according to the embodiments will hereinafter be described in detail.

Figure 11:
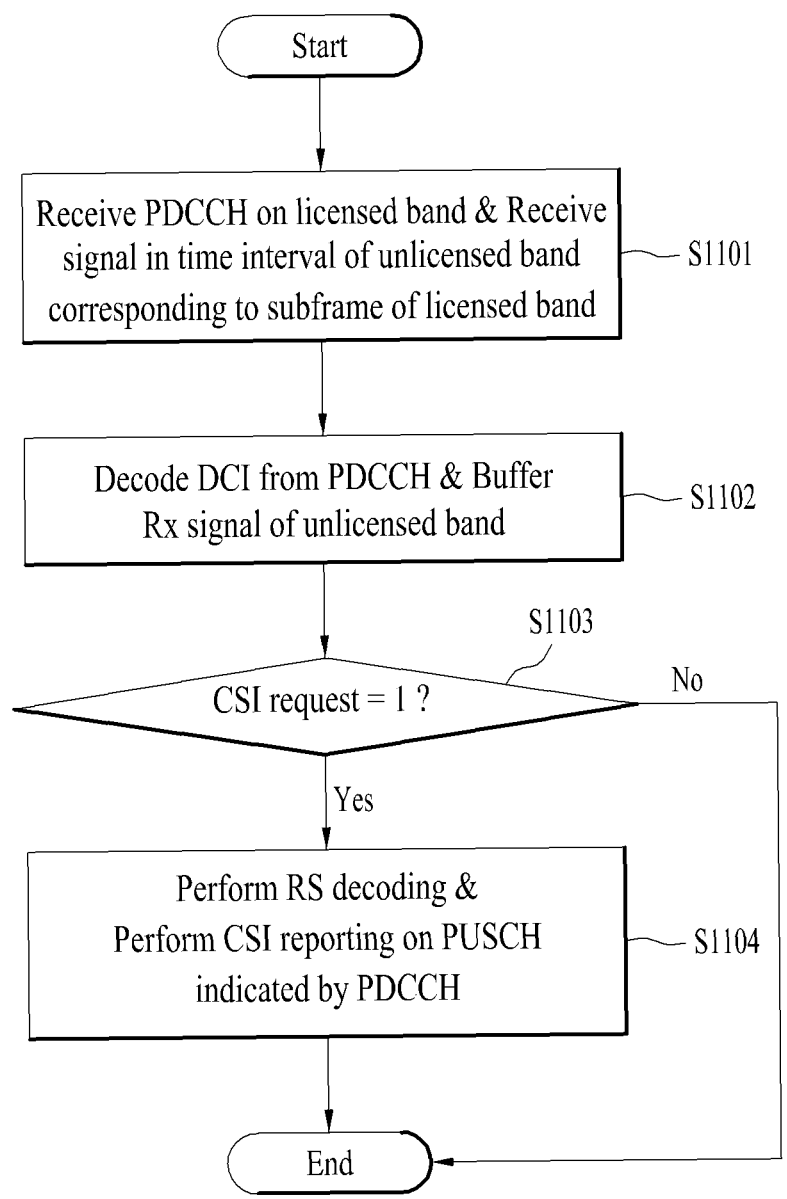
FIGS. 11 to 14 are flowcharts illustrating UE operations according to various embodiments of the present invention.

First, UBRI may be contained in DCI (for example, DCI formats 0 and 4) including an uplink grant. In more detail, UBRI may be contained in CSI request information contained in DCI format 0 or 4. In more detail, assuming that CSI request information is configured in a manner that CSI can be reported to the UE, this means that the RS is transmitted within the time interval of the unlicensed band corresponding to a time interval of a PDCCH subframe for DCI transmission in the licensed band. If CSI request information is configured in a manner that CSI report is not requested, it is possible to promise the RS not transmitted within the time interval. In contrast, if CSI request information is configured in a manner that CSI can be reported, this means that the RS is not transmitted in the time interval. If CSI request information is configured in a manner that CSI report is not requested, it is possible to promise the RS not transmitted in the time interval. If CSI request information is configured in a manner that CSI is reported to the UE, the following description assumes that the RS is transmitted within the time interval. In this case, UE operations will hereinafter be described with reference to FIG. 11. The UE receives a PDCCH at the subframe #n of the licensed band. This PDCCH may carry DCI formats 0 to 4. The DCI formats 0 to 4 may include specific information indicating whether the RS is transmitted in the unlicensed band, and may include other information indicating the presence or absence of a CSI request in the unlicensed band. In addition, the UE receives a signal within a time interval of the unlicensed band corresponding to a time interval of the subframe of the licensed band receiving the PDCCH in step S1101. The UE may obtain DCI by first decoding a PDCCH, and at the same time performs buffering of the signal transmitted in the unlicensed band in step S1102. If it is determined whether CSI request information of DCI is set to 1 in step S1103. If CSI request information is set to 1, this means that the RS is transmitted in the signal transmitted in the buffered unlicensed band. RE to which the corresponding RS is transmitted is decoded and channel measurement is performed in step S1104. Simultaneously, CSI is decided and reported to the BS. In this case, if RS is a zero-power CSI-RS and CSI request information is set to 1, interference measurement is carried out. If the confirmed CSI request information is set to zero (0), the UE need not report the CSI (in case of zero power CSI-RS, the UE need not measure interference). In addition, this means that the RS is not contained in the signal received through the unlicensed band.

In summary, CSI request and UBRI information can be simultaneously transmitted using the CSI request information. However, CSI request information of the licensed band must be used in the same manner as in the related art. For this purpose, assuming that the RS is transmitted from the BS to the UE, the BS may transmit specific information indicating which configuration will be used. That is, the RE location, the number of antenna ports, etc. may be pre-transmitted through higher layer signaling such as RRC signaling. In accordance with the above-mentioned scheme, legacy UEs incapable of using the unlicensed band may interpret CSI request information in the same manner as in the related art, new UEs capable of using the licensed band may interpret the CSI request information according to the above-mentioned scheme, and the new UEs are operated according to the interpretation result, such that effective signaling for aperiodic RS transmission is possible.

Second, a method for newly defining the UBRI in DCI formats will hereinafter be described in detail. For example, the UBRI field may be added to DCI formats 1, 1A, 1B, 1C, 1D, 2, 2A, 2B and 2C including downlink allocation information, and the added result may be transmitted through a PDCCH. In this case, UEs capable of using the unlicensed band decodes the UBRI field before channel measurement of the unlicensed band, such that it determines whether or not the RS is transmitted. If UBRI is set to 1, this means that an RE to which the reference signal is transmitted can be decoded. In this case, the UE operations are shown in FIG. 12.

Figure 12:
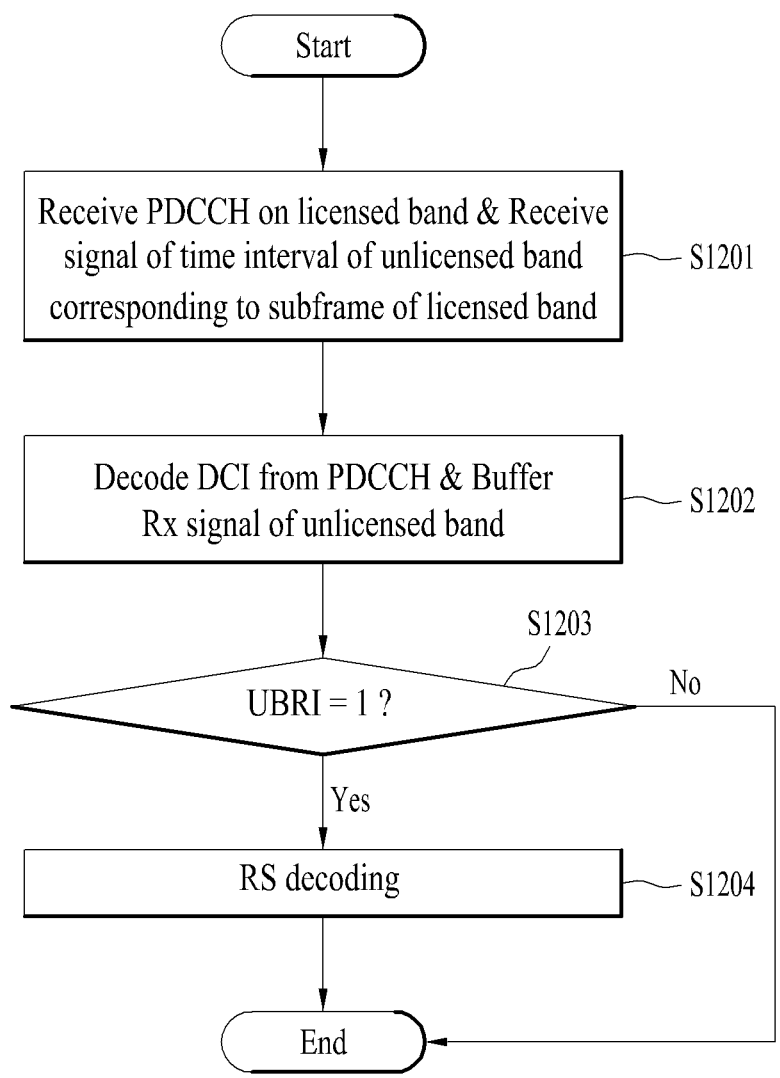

Referring to FIG. 12, a PDCCH is received at the subframe #n of the licensed band. DCI formats transmitted through a PDCCH may be DCI formats 1, 1A, 1B, 1C, 1D, 2, 2A, 2B, 2C, etc. In addition, the UE may receive a signal within the time interval of the unlicensed band corresponding to a time interval of the subframe of the licensed band in which the PDCCH is received in step S1201. The UE obtains a DCI by first decoding a PDCCH, and at the same time buffers a signal transmitted in the unlicensed band in step S1202. If it is determined whether the UBRI value of DCI is set to 1 in step S1203. If UBRI is set to 1, the RE to which the RS is transmitted in the buffered unlicensed band is decoded and channel measurement is performed in step S1204. In this case, if the RS is a zero-power CSI-RS, interference measurement is performed. If UBRI is set to zero (0), this means that the RS is not included in the signal received in the buffered unlicensed band.

Third, all UEs of the cell may transmit the UBRI through a broadcast message capable of being received by all UEs of the cell. Alternatively, a PDCCH masked with a common Radio Network Temporary Identifier (RNTI) may be transmitted in all UEs of the cell. Alternatively, after UBRI values are mapped to specific sequence sets one by one, a specific sequence may be transmitted according to whether the RS is transmitted. In this case, the sequence set may include a sequence and/or a resource location, etc. defined for PCFICH transmission in the legacy LTE/LTE-A system.

Meanwhile, the above-mentioned methods have disclosed that UBRI is contained in DCI transmitted through a PDCCH. In this case, there is needed a predetermined time until a PDCCH is blind-decoded and the UBRI value is recognized. Therefore, as described above, the UE stores a signal, that is transmitted in the time interval of the unlicensed band corresponding to the subframe of the licensed band to which the UBRI is transmitted, in a buffer. If UBRI decoding is completed and the UBRI is set to 1, it may be possible to measure the reference signal (RS).

Alternatively, the UE does not measure the RS after confirming the UBRI, and the UE performs RS measurement on the assumption that the RS is always transmitted in the unlicensed band. If the RS is not transmitted on the basis of the UBRI decoding result, the UE may discard the measurement result. In this case, the UE operations will hereinafter be described with reference to FIG. 13.

Figure 13:
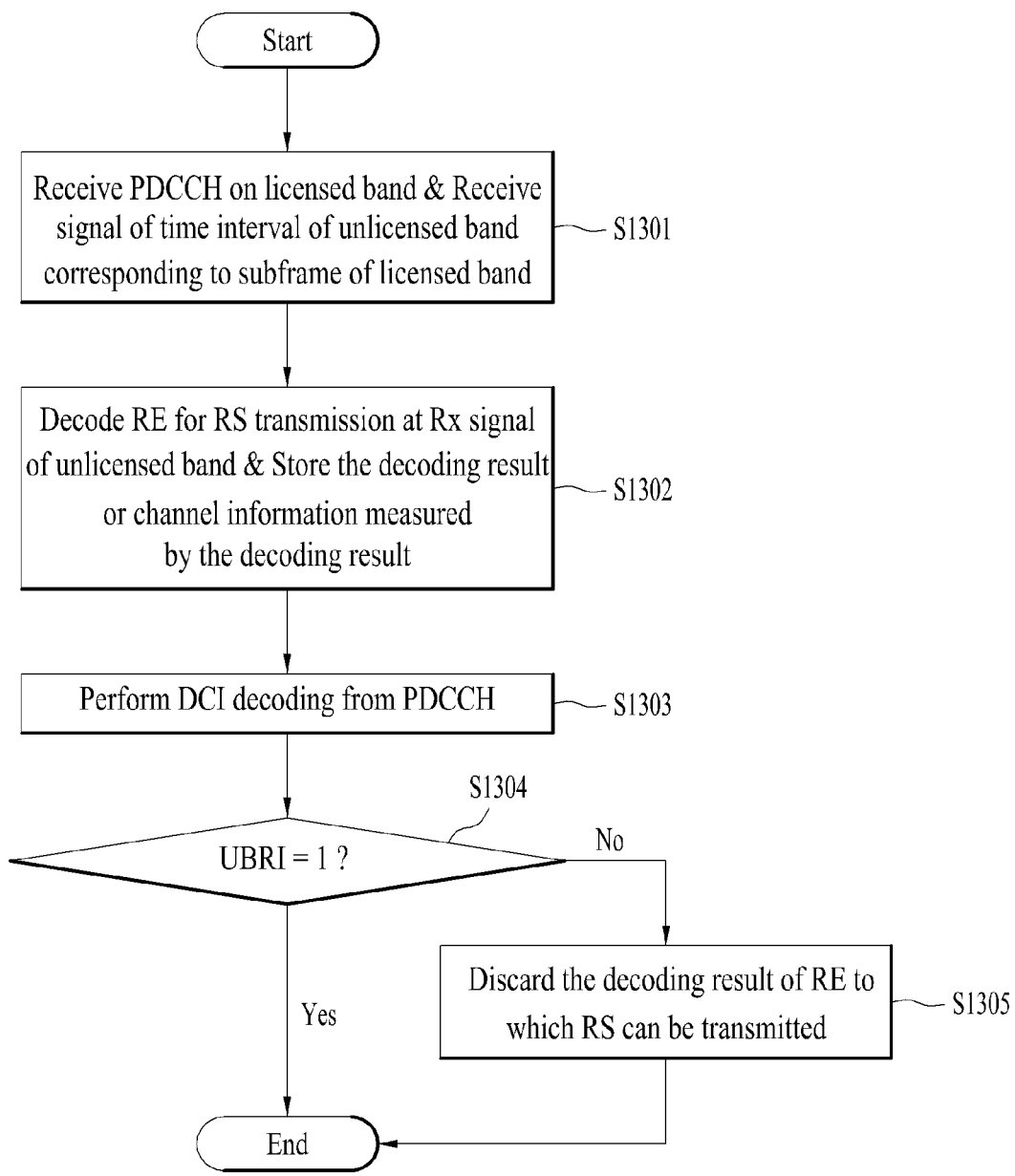

FIG. 13 is a flowchart illustrating the UE operation according to another embodiment of the present invention. Referring to FIG. 13, the UE receives a PDCCH on the licensed band, and receives a signal during a time interval of the unlicensed band corresponding to the subframe to which the PDCCH is transmitted in step S1301. The UE decodes an RE to which the RS is transmitted so as to perform channel measurement of the signal received through the unlicensed band (if the RS is a zero power CSI-RS, interference measurement is performed). The decoded result or the channel information measured by the decoded result may be stored in the buffer in step S1302. Thereafter, DCI is obtained through PDCCH blind decoding in step S1303, and the UBRI contained in the DCI is confirmed in step S1304. If the UBRI field is set to zero (0), i.e., if the signal transmitted in the unlicensed band does not include the RS, the UE may discard the decoded result for channel measurement (i.e, interference measurement result provided when the RS is a zero power CSI-RS) in step S1305.

Figure 14:
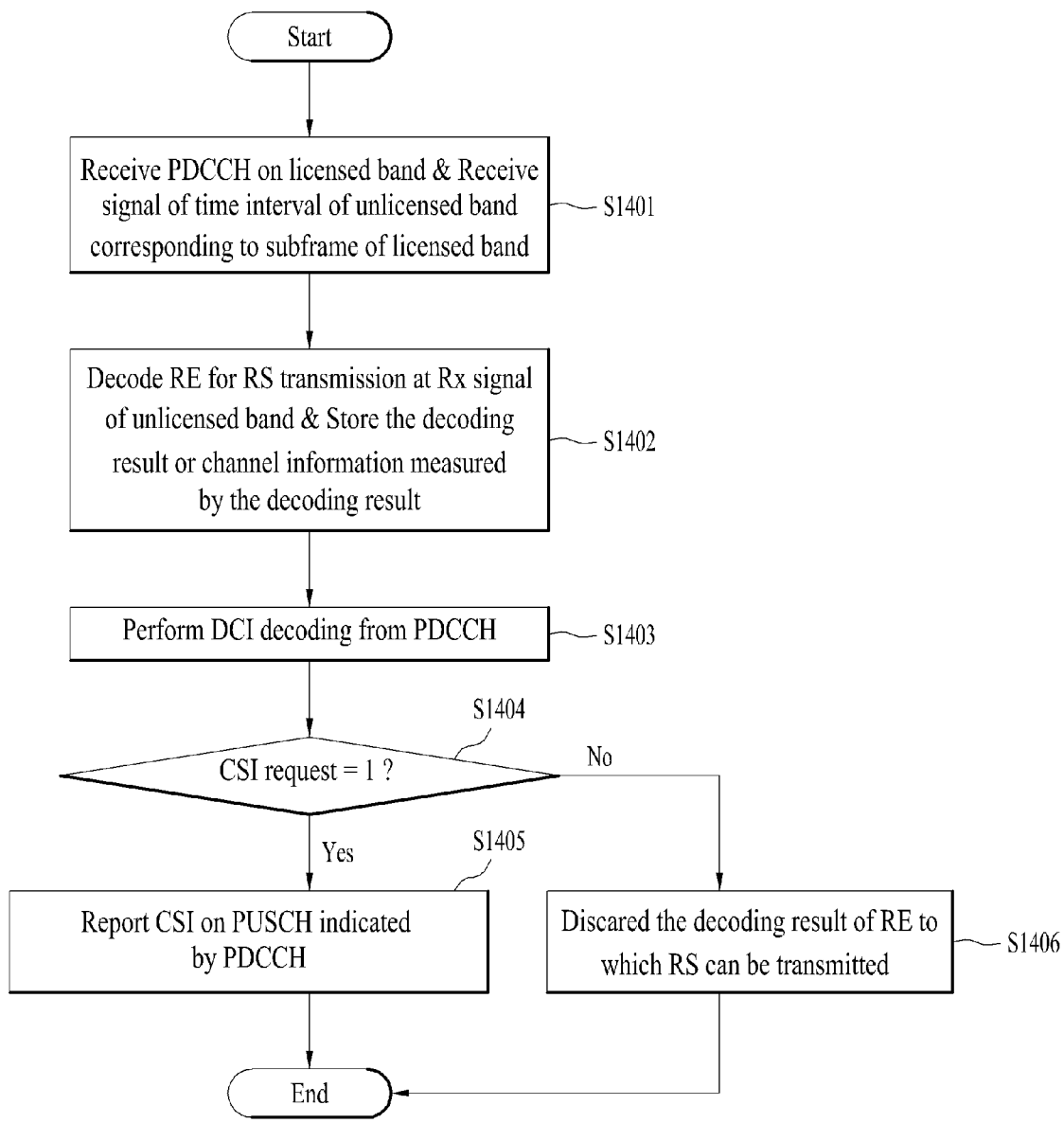

FIG. 14 is a flowchart illustrating the UE operations according to still another embodiment. Referring to FIG. 14, the UE receives a PDCCH on the licensed band, and receives a signal during a time interval of the unlicensed band corresponding to the subframe to which the PDCCH is transmitted in step S1401. The UE decodes an RE to which the RS is transmitted so as to perform channel measurement of the signal received through the unlicensed band (if the RS is a zero power CSI-RS, interference measurement is performed). The decoded result or the channel information measured by the decoded result may be stored in the buffer in step S1402. Thereafter, DCI is obtained through PDCCH blind decoding in step S1403, and a CSI request field contained in the DCI is confirmed in step S1404. If the CSI request field is set to 1, i.e., if the signal transmitted in the unlicensed band includes the RS, the UE may report the CSI to the BS in step S1404. If the CSI request field is set to zero (0), i.e., if the signal transmitted in the unlicensed band does not include the RS, the UE may discard the decoded result for channel measurement (i.e, interference measurement result provided when the RS is a zero power CSI-RS) in step S1406.

Figure 15:
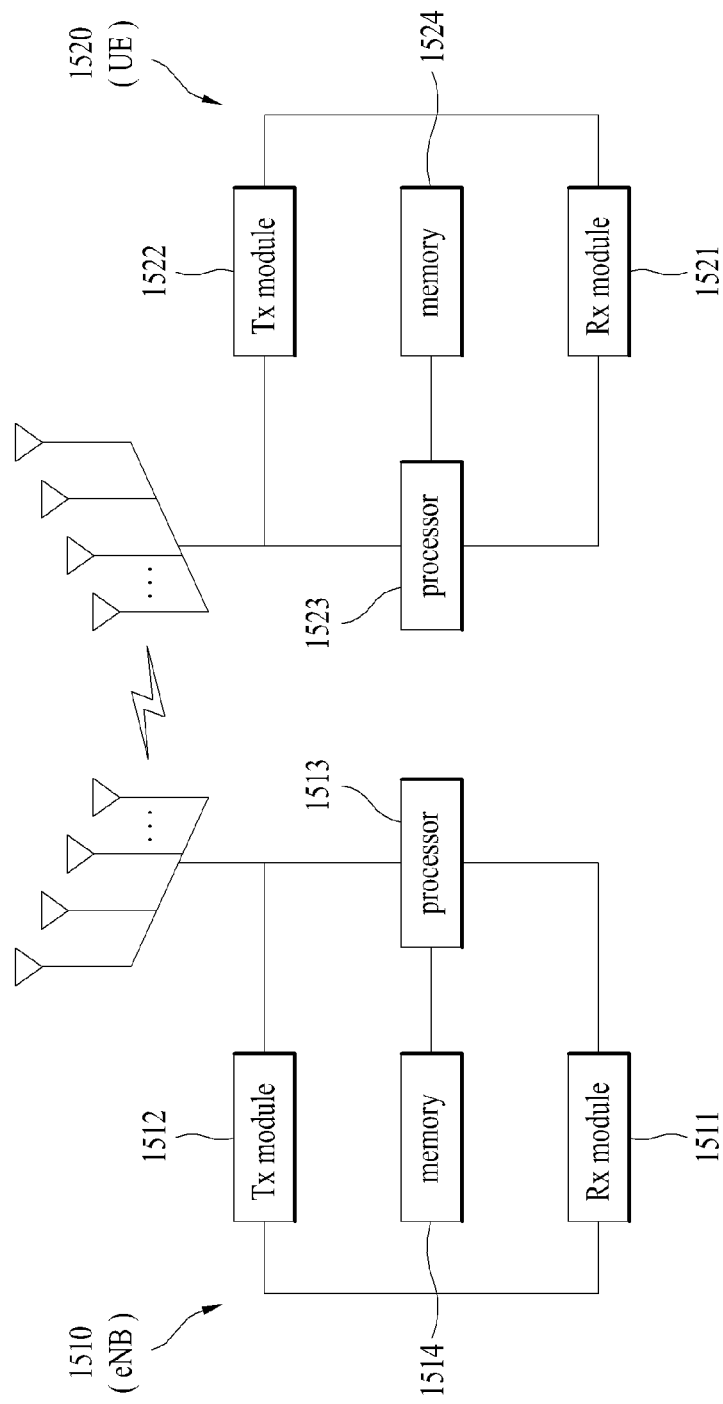
FIG. 15 is a block diagram illustrating a BS (eNB) device and a UE device according to the embodiments of the present invention.

FIG. 15 is a block diagram illustrating a BS (eNB) device and a UE device according to the embodiments of the present invention.

Referring to FIG. 15, the BS device 1510 according to the present invention may include a reception (Rx) module 1511, a transmission (Tx) module 1512, a processor 1513, a memory 1514, and a plurality of antennas 1515. The plurality of antennas 1515 indicates the BS device for supporting MIMO transmission and reception. The reception (Rx) module 1511 may receive a variety of signals, data and information on an uplink starting from the UE. The Tx module 1512 may transmit a variety of signals, data and information on a downlink for the UE. The processor 1513 may provide overall control to the transmission point apparatus 1510.

The processor 1513 of the BS device 1510 according to one embodiment transmits a PDCCH. Downlink control information (DCI) of the PDCCH may include an indicator for indicating whether the RS is transmitted in a time interval corresponding to the subframe to which the PDCCH is transmitted.

The processor 1513 of the transmission point apparatus 1510 processes information received at the BS device 1510 and transmission information to be transmitted externally. The memory 1514 may store the processed information for a predetermined time. The memory 1514 may be replaced with a component such as a buffer (not shown).

Referring to FIG. 15, the UE device 1520 may include an Rx module 1521, a Tx module 1522, a processor 1523, a memory 1524, and a plurality of antennas 1525. The plurality of antennas 1525 indicates a UE apparatus supporting MIMO transmission and reception. The Rx module 1521 may receive downlink signals, data and information from the BS (eNB). The Tx module 1522 may transmit uplink signals, data and information to the BS (eNB). The processor 1523 may provide overall control to the UE apparatus 1520.

The processor 1523 of the BS device 1520 according to one embodiment receives a PDCCH. Downlink control information (DCI) of the PDCCH may include an indicator for indicating whether the RS is transmitted in a time interval corresponding to the subframe to which the PDCCH is transmitted.

The processor 1523 of the UE apparatus 1520 processes information received at the UE device 1520 and transmission information to be transmitted externally. The memory 1524 may store the processed information for a predetermined time. The memory 1524 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 1510 shown in FIG. 15 may be applied to the eNB (BS), or may also be applied to a relay node (RN) acting as a DL transmission entity or UL reception entity without departing from the scope or spirit of the present invention. In addition, the description of the UE apparatus 1520 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Although the embodiments of the present invention have been disclosed on the basis of the 3GPP LTE mobile communication system, the embodiments can be equally or equivalently applied to various wireless communication systems.

The invention claimed is:

1. A method for transmitting control information of a base station (BS) to a user equipment (UE) in a wireless communication system, the method comprising:

transmitting, from the base station to the UE, a subframe including a physical downlink control channel (PDCCH) on a licensed band, downlink control information (DCI) of the PDCCH including an indicator indicating whether a reference signal (RS) is transmitted from the base station to the UE in a time interval of an unlicensed band or not, the indicator being included in a UE-specific search space or a common search space of the PDCCH, the time interval corresponding to the subframe to which the indicator is transmitted, if the UE is capable of using the unlicensed band and the indicator indicates that the RS is transmitted in the time interval of the unlicensed band, receiving, by the base station from the UE, a channel state information (CSI) report for both the unlicensed band and the licensed band, and if the UE is incapable of using the unlicensed band and the indicator indicates that the RS is transmitted in the time interval of the unlicensed band, receiving, by the base station from the UE, a channel state information (CSI) report for the licensed band only.

2. The method according to claim 1, wherein the reference signal (RS) is periodically transmitted in the licensed band.

3. The method according to claim 1, wherein:
the downlink control information (DCI) includes uplink grant information; and
the uplink grant information is contained in channel state information (CSI) request information of the downlink control information (DCI).

4. The method according to claim 3, wherein, if the CSI request information is configured such that channel state information is requested from a user equipment (UE), the indicator indicates that the reference signal (RS) is transmitted in the time interval.

5. The method according to claim 1, wherein the PDCCH is masked with a common identifier (ID) of a plurality of UEs located in a cell.

6. The method according to claim 1, wherein the reference signal (RS) is any one of a cell-specific reference signal, a channel state information-reference signal (CSI-RS), or a CSI-RS having transmission (Tx) power of zero.

7. The method according to claim 1, wherein:
the resource for transmission of the reference signal (RS) is always decoded by a user equipment (UE) during the time interval; and
the decoded information is discarded when the indicator indicates non-transmission of the reference signal (RS).

8. A method for receiving control information of a user equipment (UE) in a wireless communication system, the method comprising:

receiving, by the UE from a base station, a subframe including a physical downlink control channel (PDCCH) on a licensed band, downlink control information (DCI) of the PDCCH including an indicator indicating whether a reference signal (RS) is transmitted from the base station to the UE in a time interval of an unlicensed band or not, the indicator being included in a UE-specific search space or a common search space of the PDCCH, the time interval corresponding to the sub frame to which the indicator is transmitted, if the UE is capable of using the unlicensed band and the indicator indicates that the RS is transmitted in the time interval, transmitting, by the UE to the base station, a channel state information (CSI) report for both the unlicensed band and the licensed band, and if the UE is incapable of using the unlicensed band and the indicator indicates that the RS is transmitted in the time interval, transmitting, by the UE to the base station, a channel state information (CSI) report for the licensed band only.

9. The method according to claim 8, wherein the reference signal (RS) is periodically transmitted in the licensed band.

10. The method according to claim 8, wherein:
the downlink control information (DCI) includes uplink grant information; and
the uplink grant information is contained in channel state information (CSI) request information of the downlink control information (DCI).

11. The method according to claim 10, wherein, if the CSI request information is configured such that channel state information is requested from a user equipment (UE), the indicator indicates that the reference signal (RS) is transmitted in the time interval.

12. The method according to claim 8, wherein the PDCCH is masked with a common identifier (ID) of a plurality of UEs located in a cell.

13. The method according to claim 8, wherein:
the user equipment (UE) always decodes the resource for transmission of the reference signal (RS) during the time interval; and
the decoded information is discarded when the indicator indicates non-transmission of the reference signal (RS).

14. A base station (BS) apparatus for use in a wireless communication system, comprising:
a transmission (Tx) module; and
a processor configured to transmit a physical downlink control channel (PDCCH) to a user equipment (UE),
wherein downlink control information (DCI) of the PDCCH includes an indicator indicating whether a reference signal (RS) is transmitted from the base station to the UE in a time interval of an unlicensed band or not, the indicator being included in a UE-specific search space or a common search space of the PDCCH,
wherein the time interval corresponds to the subframe to which the indicator is transmitted,
wherein, if the UE is capable of using the unlicensed band and the indicator indicates that the RS is transmitted in the time interval, the base station receives channel state information (CSI) report for both the unlicensed band and the licensed band from the UE, and
wherein, if the UE is incapable of using the unlicensed band and the indicator indicates that the RS is transmitted in the time interval, the base station receives, from the UE, channel state information (CSI) report for the licensed band only.

15. A user equipment (UE) apparatus for use in a wireless communication system, comprising:
a reception (Rx) module; and
a processor configured to receive a physical downlink control channel (PDCCH) from a base station,
wherein downlink control information (DCI) of the PDCCH includes an indicator indicating whether a reference signal (RS) is transmitted from the base station to the UE in a time interval of an unlicensed band or not, the indicator being included in a UE-specific search space or a common search space of the PDCCH,
wherein the time interval corresponds to the subframe to which the indicator is transmitted,
wherein, if the UE is capable of using the unlicensed band and the indicator indicates that the RS is transmitted in the time interval, the UE transmits a channel state information (CSI) report for both the unlicensed band and the licensed band to the UE, and wherein, if the UE is incapable of using the unlicensed band and the indicator indicates that the RS is transmitted in the time interval, the UE transmits, to the UE, a channel state information (CSI) report for the licensed band only.

* * * * *